United States Patent Office 3,245,985
Patented Apr. 12, 1966

3,245,985
PROCESS FOR PREPARING 2α,16α-DIALKYL STEROIDS OF THE PREGNENE SERIES
Meyer Sletzinger and Donald Reinhold, North Plainfield, and John M. Chemerda, Metuchen, N.J., assignors to Merck & Co., Inc., Rahway, N.J., a corporation of New Jersey
No Drawing. Filed Aug. 13, 1958, Ser. No. 754,722
4 Claims. (Cl. 260—239.55)

This invention relates to novel steroids having cortisone-like anti-inflammatory activity and to processes for preparing the same. More particularly this invention relates to 2α,16α-di-lower alkyl steroids of the 4-pregnene series and 2,16α-di-lower alkyl steroids of the 1,4-pregnadiene series.

The compounds of the present invention have a general formula of either

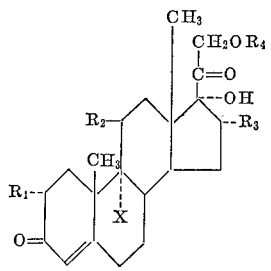

or

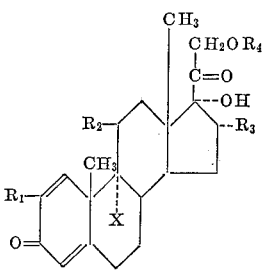

where $R_1$ and $R_3$ are lower alkyl radicals, containing from one to four carbon atoms, $R_2$ is either β-hydroxyl or keto, $R_4$ is either hydrogen or a lower alkanoyl radical, containing from one to ten carbon atoms, and X is either hydrogen or fluorine.

The compounds of the present invention, especially the 2α,16α-dimethyl steroids of the 4-pregnene series and the 2,16α-dimethyl steroids of the 1,4-pregnadiene series are highly active anti-inflammatory agents, useful in the treatment of arthritis and related diseases. These compounds are effective when administered in low dosage, thereby minimizing side effects.

The starting materials used in the preparation of the compounds of this invention have the following structural formula:

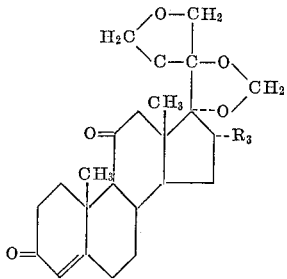

The starting material 16α-methyl-17α,20,20,21-bis-methylenedioxy-4-pregnene-3,11,20-trione in this process is conveniently prepared starting with the known 3-acetoxy-16-pregnene-11,20-dione in accordance with the following procedure:

The compound 3α-acetoxy-16-pregnene-11,20-dione is reacted with methyl magnesium iodide in the presence of cuprous chloride thereby forming 16α-methyl-3α-hydroxy-11,20-pregnanedione. The latter compound is reacted with acetic anhydride in the presence of p-toluene sulfonic acid catalyst to form a mixture of enol acetates containing 16α-methyl-3α,20-diacetoxy-17(20)-pregnene-11-one. This mixture, after chromatographic purification to remove any unchanged starting material, is reacted with perbenzoic acid, and the resulting 16α-methyl-17α,20-epoxy-3α,20-diacetoxy-11-pregnanone is hydrolyzed with methanolic potassium bicarbonate to produce 16α-methyl-3α,17α-dihydroxy-11,20-pregnanedione. The latter compound is reacted with bromine in chloroform to form 21-bromo-16α-methyl-3α,17α-dihydroxy-11,20-pregnanedione. Reaction of this compound with sodium iodide and anhydrous potassium acetate in acetone produces 16α-methyl-3α,17α-dihydroxy-21-acetoxy-11,20-pregnanedione. This compound is reacted with chromium trioxide in pyridine to form 16α-methyl-17α-hydroxy-21-acetoxy-3,11,20-pregnanetrione.

The 16α-methyl-17α-hydroxy-21-acetoxy-3,11,20-pregnanetrione is reacted with bromine in a glacial acetic acid-chloroform mixture to produce 4-bromo-16α-methyl-17α-hydroxy-21-acetoxy-3,11,20-pregnanetrione, which is then reacted with semicarbazide to form 16α-methyl-17α-hydroxy-21-acetoxy-4-pregnene-3,11,20-trione 3-semicarbazone. The 16α-methyl-17α-hydroxy-21-acetoxy-4-pregnene-3,11,20-trione 3-semicarbazone is hydrolyzed in an acidic medium, with pyruvic acid or hydrochloric acid, for example, to form 16α-methyl-17α-hydroxy-21-acetoxy-4-pregnene-3,11,20-trione (16α-methylcortisone acetate). The 16α-methylcortisone acetate is hydrolyzed to the free alcohol (16α-methyl-17α,21-dihydroxy-4-pregnene-3,11,20-trione) by reaction with sodium methoxide and methanol followed by neutralization with acid.

The foregoing procedure is described in J. Am. Chem. Soc. 80, pages 3160–3161 (1958). A slightly modified procedure for forming 16α-methylcortisone is described in the copending application of Glen E. Arth, David Johnston, and Lewis H. Sarett, Serial No. 642,655, filed February 27, 1957. In that procedure 4-bromo-16α-methyl-17α-hydroxy-21-acetoxy-3,11,20-pregnanetrione is reacted with semicarbazide to form 16α-methyl-17α-hydroxy-21-acetoxy-4-pregnene-3,11,20-trione-3,20-bis-semicarbazone. The 16α-methyl-17α-hydroxy-21-acetoxy-4-pregnene-3,11,20-trione-3,20-bis-semicarbazone is reacted with potassium bicarbonate or potassium hydroxide in aqueous methanol to form 16α-methyl-17α,21-dihydroxy-4-pregnene-3,11,20-trione-3,20-bis-semicarbazone, which is hydrolyzed under acidic conditions, for example with hydrochloric acid, to produce 16α-methyl-17α,21-dihydroxy-4-pregnene-3,11,20-trione.

The compound 16α-methylcortisone is converted to 16α-methyl-17α,20,20,21-bis-methylenedioxy-4-pregnene-3,11-dione by reaction with aqueous formaldehyde in an acidic medium. In a typical procedure a reagent mixture of 16α-methylcortisone, aqueous formaldehyde, and concentrated hydrochloric acid in chloroform are reacted at room temperature for approximately four days. The product is recovered from the chloroform layer. The product 16α-methyl-17α,20,20,21-bis-methylenedioxy-4-pregnene-3,11-dione is the starting material for preparing compounds of this invention, wherein $R_3$ is methyl.

Other 16α-alkyl-17α,20,20,21-bis-methylenedioxy-4-pregnene-3,11-dione starting materials can be prepared according to the foregoing procedure, except that the compound 3α-acetoxy-16-pregnene-11,20-dione is reacted with a Grignard reagent having the desired alkyl group.

such as ethyl magnesium iodide, propyl magnesium iodide, isopropyl magnesium iodide, or butyl magnesium iodide, instead of methyl magnesium iodide.

The compound 2α,16α-dimethyl - 11β,17α,21 - trihydroxy-4-pregnene-3,20-dione can be prepared according to the following equation:

20,20,21-bis-methylenedioxy-4-pregnene-3,11-dione, or the like.

The compound 2 - ethyloxalyl - 16α-methyl-17α, 20,20-21 - bis - methylenedioxy-4-pregnene-3,11-dione or analog thereof, having an ester resin group at the 2-position, is alkylated at the 2-position with a lower alkyl iodide, such

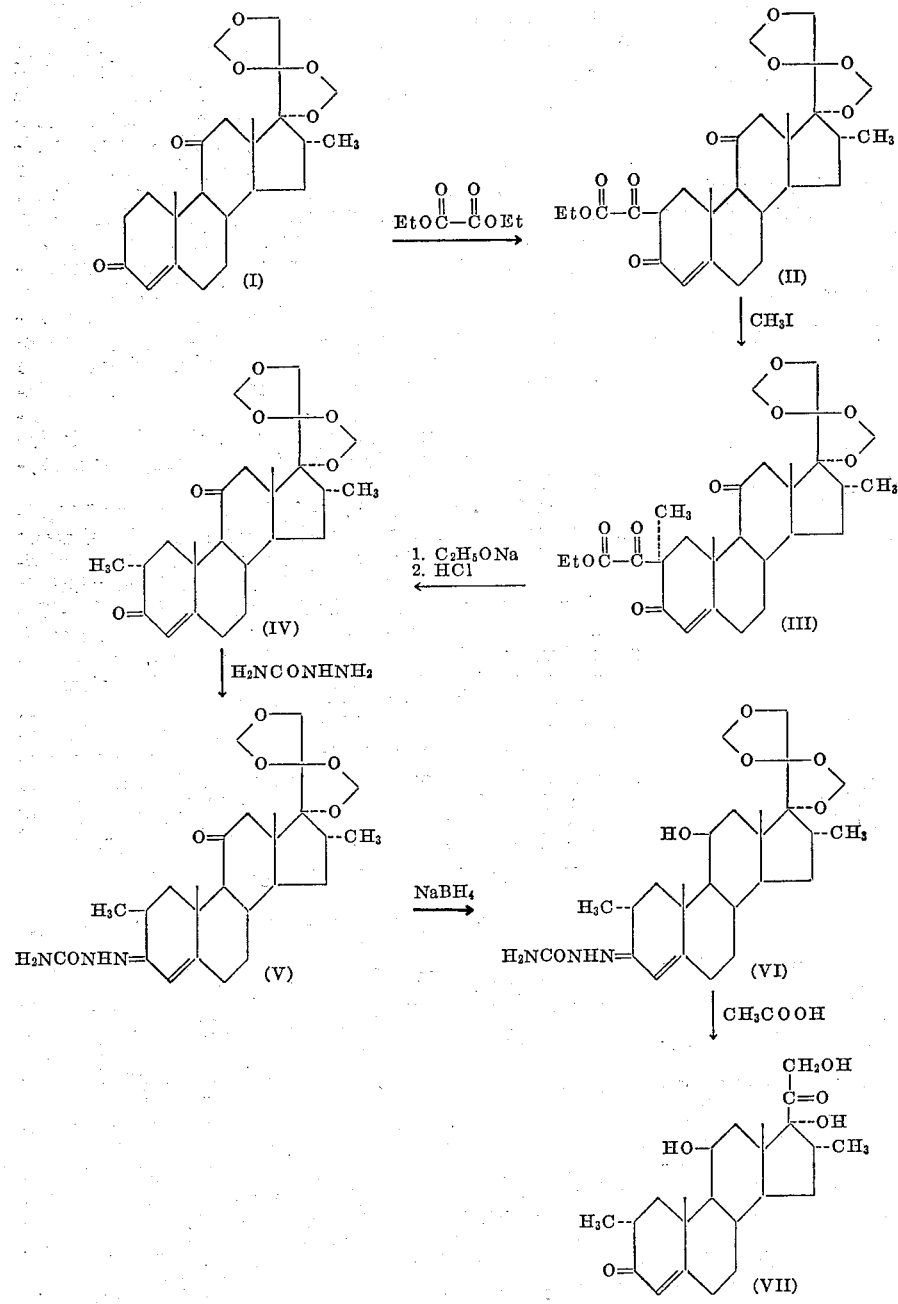

The starting material 16α - methyl - 17α,20,20,21 - bis-methylenedioxy-4-pregnene-3,11-dione (I) is reacted with a dialkyl ester of a lower dicarboxylic acid. Typical esters are diethyl oxalate, dimethyl oxalate, dimethyl carbonate, and diethyl carbonate. This reaction is carried out in the presence of an alkali metal alcoholate such as sodium methoxide. This results in the formation of an enolate which is acidified without isolation to form a compound having an ester residue at the 2-position, as for example 2-ethyloxalyl-16α-methyl-17α,20,20,21-bis-methylenedioxy - 4 - pregnene - 3,11 - dione (II), 2 - methyloxalyl - 16α - methyl - 17α,20,20,21 - bis - methylenedioxy - 4 - pregnene - 3,11 - dione, 2 - carbomethoxy - 16α-methyl - 17α,20,20,21 - bis - methylene - dioxy - 4 - pregnene - 3,11 - dione, 2 - carbethoxy - 16α - methyl - 17α- as methyl iodide, ethyl iodide, or the like. Typical of the compounds thus formed is 2-ethyloxalyl-2,16α-dimethyl - 17α,20,20,21-bis-methylenedioxy-4-pregnen-3,11-dione (III), which is formed by reaction of 2-ethyloxalyl-16α-methyl-17α,20,20,21-bis-methylenedioxy - 4 - pregnene-3,11-dione (II) with methyl iodide. The ester residue at the 2-position is removed by treatment with an alkali metal alcoholate such as sodium methoxide, followed by acidification. The resulting product is 2α,16α-dimethyl - 17α,20,20,21 - bis - methylenedioxy-4-pregnene-3,11-dione (IV) or 2α,16α-dialkyl homolog thereof.

Semicarbazide is reacted with 2α,16α-dimethyl-17α,20, 20,21 - bis - methylenedioxy - 4 - pregnene - 3,11-dione (IV), thereby forming 2α,16α-dimethyl-17α,20,20,21-bis-methylene-dioxy-3,11-dione 3-semicarbazone (V). Reduction of this compound with sodium borohydride in a solvent such as tetrahydrofuran in an inert atmosphere affords 2α,16α-dimethyl-17α,20,20,21-bis-methylenedioxy-11β - hydroxy - 4 - pregnene-3-one 3-semicarbazone (VI). This compound can be recovered by evaporation of the solvent after discharging the excess sodium borohydride with acid. The 3-semicarbazone and the 17α,20,20,21-bis-methylenedioxy group are simultaneously removed by acid hydrolysis with strong aqueous acetic acid, aqueous hydrochloric acid, or other acid, forming 2α,16α-dimethyl-11β,17α,21-trihydroxy-4-pregnene-3,20-dione, which is also known as 2α,16α-di-methylhydrocortisone (VIII).

The preparation of 2α,16α-dimethylhydrocortisone, according to the foregoing equation and description, has been described as illustrative of the synthesis of 2α,16α-dialkyl derivatives of hydrocortisone. Other 2α-lower alkyl derivatives such as 2α-ethyl-16α-methyl-hydrocortisone can be formed by choice of the appropriate alkylating agent, e.g. ethyl iodide in the above synthesis. Other 16α-alkyl derivatives such as 2α-methyl-16α-ethyl-hydrocortisone are formed according to the above synthesis, starting with the appropriate 16α-alkyl cortisone, e.g. 16α-ethylcortisone.

The compound 2α,16α-dimethylcortisone (VIII) is formed by hydrolysis of 2α,16α-dimethyl-17α,20,20,21-bis-methylenedioxy - 4 - pregnene-3,11-dione with acetic acid, hydrochloric acid, or other suitable acids. Other 2α,16α-dialkyl cortisones can be formed similarly from the corresponding 17α,20,20,21-bis-methylenedioxy compounds.

The Δ⁴-unsaturated compounds of this invention can be transformed to the corresponding Δ¹,⁴-unsaturated compounds by the action of a dehydrogenating microorganism such as *Bacillus sphaericus* under growth conditions for the microorganism. The equation for this dehydrogenation is as follows:

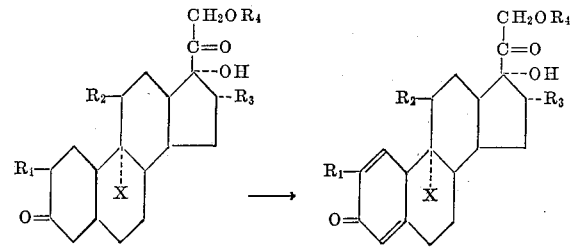

Various strains of *Bacillus sphaericus* have dehydrogenating activity. Among the suitable strains available from the American Type Culture Collection, Washington, D.C., are ATCC 12488, ATCC 245, and ATCC 7054.

Compounds which can be prepared by dehydrogenation with *Bacillus sphaericus* include 2,16α - dimethylprednisolone, 2,16α - dimethylprednisone, 2,16α - diethylprednisolone, 2-methyl-16α-ethylprednisolone, 2-ethyl-16α-methylprednisolone, 2,16α - dimethyl - 9α - fluoroprednisolone, and 2,16α-dimethyl-9α fluoroprednisone. The 21-lower carboxylic acid esters of the above compounds, such as the acetates, tert.-butyl acetates, hemisuccinates, and the like, can also be formed.

The 9α-fluoro compounds of the present invention can be prepared by the method indicated in the equation below:

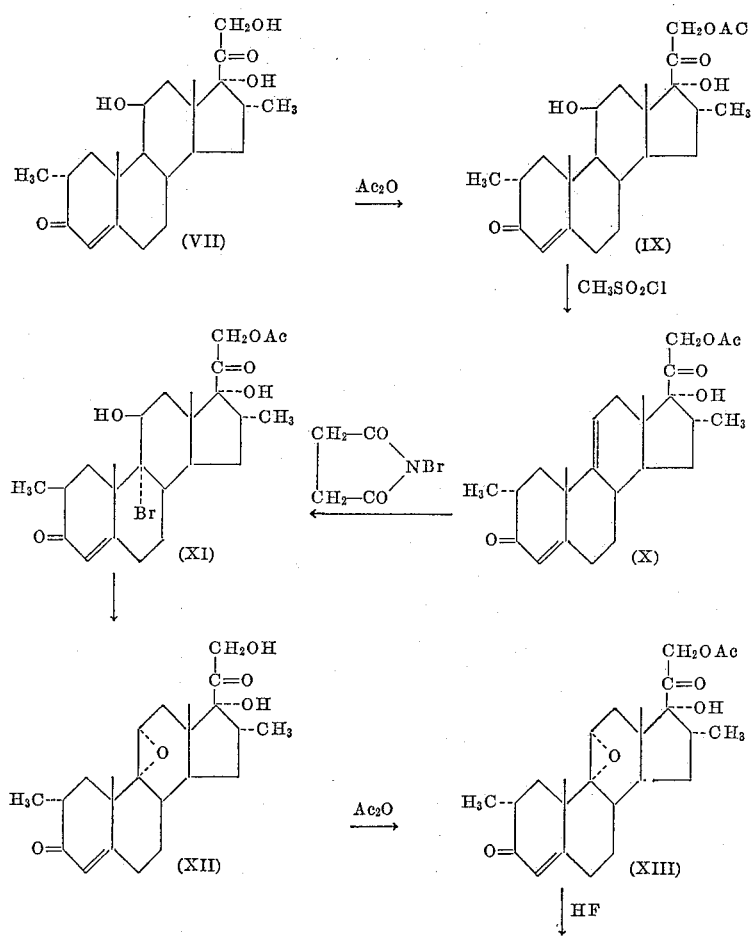

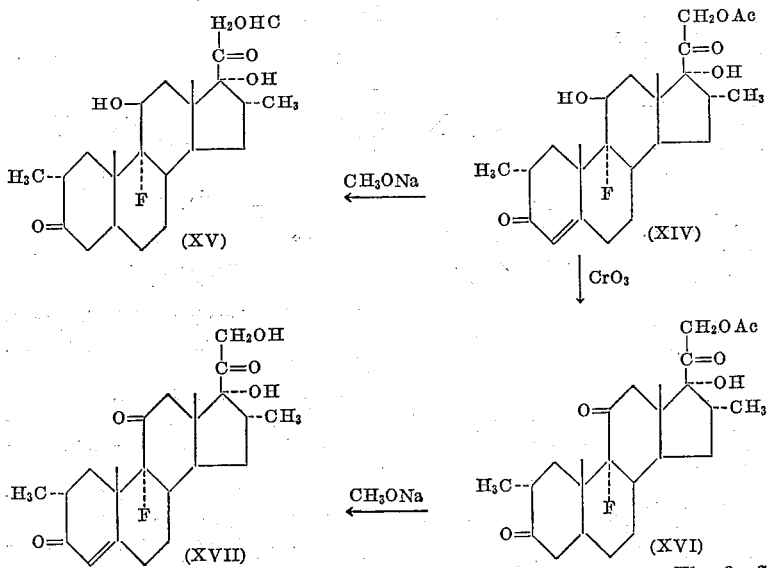

The above equation shows the transformation of 2α,16α-dimethylhydrocortisone (VII) to either 2α,16α-dimethyl-9α-fluorohydrocortisone (XV) or 2α,16α-diethyl-9α-fluorocortisone (XVII), as illustrative of the synthesis of 9α-fluoro steroids of this invention. Other compounds which can be made by this method include 2α,16α-diethyl-9α-fluorohydrocortisone from 2α,16α-diethylhydrocortisone, and 2α,16α-dimethyl-9α-fluoro-prednisolone and 2α,16α-dimethyl-9α-fluoroprednisone from 2α,16α-dimethylprednisolone.

The compound 2α,16α-dimethyl-11β,17α,21-trihydroxy-4-pregnene-3,20-dione (2α,16α-dimethylhydrocortisone) (VII) is acetylated with acetic anhydride, forming 2α,16α-dimethylhydrocortisone 21-acetate (IX). This compound is dehydrated with a suitable dehydrating agent forming 2α,16α-dimethyl-17α-hydroxy-21-acetoxy-4,9(11)-pregnadiene-3,20-dione (X). Methanesulfonyl chloride, a preferred dehydrating agent, is indicated in the above equation, although it is understood that other dehydrating agents recognized in the art, such as methyl chlorosulfinate or phosphorus oxychloride may be used instead. The reaction is carried out in a suitable anhydrous organic solvent such as dimethylformamide, pyridine, or the like.

The compound 2α,16α-dimethyl-17α-hydroxy-21-acetoxy-4,9(11)-pregnadiene-3,20-dione (X) is reacted with a hypohalous acid, either hypochlorous or hypobromous acid, or a reagent combination which furnishes the equivalent of either of these acids in solution. An especially advantageous reagent combination consists of N-bromosuccinimide and perchloric acid which are added to the reaction sequentially in the order named. The reaction is conducted at low temperature (about 15° C. or lower) in a solvent such as dioxane or acetone. Where N-bromosuccinimide is the reagent, the resulting compound is 2α,16α-dimethyl-9α-bromo-11β,17α-dihydroxy-21-acetoxy-4-pregnene-3,20-dione (XI).

Reflux of 2α,16α-dimethyl-9α-bromo-11β,17α-dihydroxy-21-acetoxy-4-pregnene-3,20-dione (XI) under alkaline conditions, for example, potassium acetate in absolute alcohol, forms the corresponding 9,11-epoxy compound, which in the illustrative equation is 2α,16α-dimethyl-9,11-oxido-17α,21-dihydroxy-4-pregnene-3,20-dione (XII). It should be noted that at least partial deacetylation occurs at the 21-position during the alkaline hydrolysis. Reacetylation with acetic anhydride forming 2α,16α-dimethyl-9,11-oxido-17α-hydroxy-21-acetoxy-4-pregnene-3,20-dione (XIII) is desirable before proceeding further with the synthesis.

The 9α-fluoro group is introduced by reacting 2α,16α-dimethyl-9,11-oxido-17α-hydroxy-21-acetoxy-4-pregnene-3,20-dione with anhydrous hydrogen fluoride at low temperature (approximately 0° C.) in an anhydrous solvent such as chloroform or a mixture thereof with tetrahydrofuran. The resulting product is 2α,16α-dimethyl-9α-fluoro-11β,17α-dihydroxy-21-acetoxy-4-pregnene-3,20-dione (XIV). This compound can be converted to the corresponding 21-alcohol by treatment with sodium methoxide in an inert atmosphere. Other hydrolysis procedures yielding the free alcohol such as reaction with methanolic potassium hydroxide will be apparent to those skilled in the art. The hydrolysis product is 2α,16α-dimethyl-9α-fluoro-11β,17α,21-trihydroxy-4-pregnene-3,20-dione (XV), which may also be referred to as 2α,16α-dimethyl-9α-fluorohydrocortisone.

Where 9α-fluoro-11-keto compounds, such as 2α,16α-dimethyl-9α-fluoro-17α,21-dihydroxy-4-pregnene-3,11,20-trione (XVII) are desired, the corresponding 9α-fluoro-11β-hydroxy compound, e.g. 2α,16α-dimethyl-9α-fluorohydrocortisone acetate (XIV), is oxidized with chromic anhydride to 2α,16α-dimethyl-9α-fluorocortisone acetate (XVI), which is hydrolyzed to 2α,16α-dimethyl-9α-fluorocortisone (XVII).

While the preparation of compounds according to this invention has been described with particular reference to the synthesis of those compounds having a 21-hydroxy or free alcohol group, it is understood that the 21-lower carboxylic acid esters thereof can be prepared by reaction with the appropriate anhydride. The 21-acetates, tert.-butyl acetates, and hemisuccinates are among the esters which can be prepared in this way. In general any 21-carboxylic acid ester containing from 1 to 10 carbon atoms in the acyl radical can be prepared according to this invention.

The following specific procedure illustrates a method of preparing the starting material 16α-methyl-17α,20;20,21-bis-methylenedioxy-4-pregnene-3,11-dione.

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 3-acetoxy-16-pregnene-11,20-dione in 175 ml. of ether. A white granular solid separates during this addition. The resulting mixture is heated under gentle reflux for two hours after which the reaction mixture is cooled, and 125 ml. of saturated aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. This oil, which is essentially 16α-methyl-3α-hydroxy-11,20-pregnanedione, is heated for 15 minutes at 60°–70° C. with a mixture of 25 ml. of pyridine. The acetylated product is purified by chromatography on acid-washed alumina followed by crystallization from petroleum ether to give approximately 1.5 g. of substantially pure 16α-methyl-3-acetoxy-11,20-pregnanedione.

A solution of 22 g. of 16α-methyl-3α-acetoxy-11,20-pregnanedione and 1 g. of p-toluene-sulfonic acid in 250 ml. of acetic anhydride is heated at reflux under nitrogen for a period of approximately three days. Two grams of anhydrous potassium acetate is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is adsorbed on 660 g. of acid-washed alumina, the alumina adsorbate is then washed with 2 liters of petroleum ether. The adsorbate is then eluted with 85:15 petroleum ether-ether mixture, and the first four liters of eluate is collected, and evaporated to dryness in vacuo to give a mixture of enol acetates containing 16α-methyl-3α,20-diacetoxy-17(20)-pregnene-11-one. This mixture of enolates, weighing approximately 14 g., is dissolved in 50 ml. of benzene and treated with an excess of perbenzoic acid over a 16-hour period. The reaction mixture is shaken with dilute aqueous potassium hydroxide solution until the benzene layer is free of perbenzoic acid; the benzene layer is then washed with water until neutral, dried, and the solvent evaporated in vacuo to give a crystalline material, 16α-methyl-17α,20-epoxy-3α,20-diacetoxy-11-pregnanone. The latter material is dissolved, without purification, in 200 ml. of methanol, 120 ml. of water, and 10 g. of potassium bicarbonate; and the resulting solution is heated at reflux under nitrogen for a period of 16 hours. The methanol is evaporated from the hydrolysis solution in vacuo, and the residual oil is extracted from the resulting aqueous solution with chloroform. The chloroform extract is washed with water to neutrality, dried, and the chloroform is evaporated under reduced pressure. The residual oil is triturated with ether, and the crystalline material thus formed is recrystallized from ethyl acetate-petroleum ether to give 16α-methyl-3α,17α-dihydroxy-11,20-pregnanedione.

To a solution of 7.0 g. of 16α-methyl-3α,17α-dihydroxy-11,20-pregnanedione in 50 ml. of chloroform is added dropwise with stirring a solution containing 3.36 g. of bromine in 24.2 ml. of chloroform over a period of about 60 minutes. The reaction mixture is dissolved in 200 ml. of ethyl acetate, and the resulting solution washed with water until neutral, dried, and the solvents evaporated therefrom in vacuo. The residual crude material is dissolved in a minimum quantity of ethyl acetate, the resulting solution is diluted with ether, and the mixture is stirred until crystals form. The crystalline product is recovered by filtration and washed, by slurrying, with 50:50 ether-petroleum ether mixture to give about 5 g. of 21-bromo-16α-methyl-3α,17α - dihydroxy - 11,20 - pregnanedione.

This 5 g. of 21-bromo-16α-methyl-3α,17α-dihydroxy-11,20-pregnanedione is mixed with 5.0 g. of anhydrous potassium acetate, 4.0 g. of sodium iodide and 0.03 ml. of glacial acetic acid; and 100 ml. of acetone is added to the resulting mixture. This mixture is then heated at reflux, with stirring, for a period of about 16 hours; and the rection mixture is cooled, filtered, and the insoluble material is washed with acetone. The filtered solution is evaporated in vacuo, thereby removing the solvents; and the residual material is slurried with water, and the aqueous mixture extracted with ethyl acetate. The ethyl acetate extract is washed with water to neutrality, dried; and the solvent is evaporated in vacuo to give an oil. This oil is crystallized from ether, and recrystallized from ethyl acetate-ether to give 16α-methyl-3α,17α-dihydroxy-21-acetoxy-11,20-pregnanedione.

A solution of 400 mg. of 16α-methyl-3α,17α-dihydroxy-21-acetoxy-11,20-pregnanedione in 4 ml. of pyridine is added to the complex formed by the addition of 400 mg. of chromium trioxide to 4 ml. of pyridine. The mixture is swirled until thoroughly mixed, and then allowed to stand at room temperature overnight. The reaction mixture is poured into water, and the aqueous mixture is extracted with ether, and then twice with ethyl acetate. The combined ether and ethyl acetate extracts are washed with dilute aqueous sulfuric acid at about 0° C., and then with water until neutral. The organic solvent layer is then dried, the solvents are evaporated therefrom in vacuo; and the residual crystalline material is purified by the crystallization from ethyl acetate to give 16α-methyl-17α-hydroxy-21-acetoxy-3,11,20-pregnanetrione.

To 100 mg. of 16α-methyl-17α-hydroxy-21-acetoxy-3,11,20-pregnanetrione dissolved in 2 ml. of chloroform and 2.25 ml. of glacial acetic acid, at a temperature of −55° C., is added two drops of a 0.001 N solution of dry HBr in glacial acetic acid. To about 0.38 ml. of 0.001 N HBr in glacial acetic acid, at −55° C., is added 0.43 ml. of a solution containing 40 mg. of bromine in chloroform; and the resulting solution is added, over about a 10-minute period, to the solution of the steroid, while maintaining the reaction mixture at about −55° C. The reaction mixture is allowed to stand at −55° C. for about one-half hour, a solution containing 250 mg. of sodium acetate in 3 ml. of water is added; and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 2 ml. of acetone, and to the solution is added 25 mg. of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 1 ml.; petroleum ether is added to this solution; and the crystalline material which separates is recovered and dried to give approximately 90 mg. of 4-bromo-16α-methyl-17α-hydroxy-21-acetoxy-3,11,20-pregnanetrione.

A mixture of 48 mg. of semicarbazide, 48 mg. of 4-bromo - 16α,17α - hydroxy-21-acetoxy-3,11,20-methylpregnanetrione, and 0.6 mg. of ethanol is heated under reflux in contact with a nitrogen atmosphere for a period of about three days, and the reaction solution is evaporated to a small volume, diluted with water and the crystalline material recovered and purified by recrystallization from aqueous methanol to give 16α-methyl-17α-hydroxy-21-acetoxy-4-pregnene-3,11,20-trione 3,20-bis-semicarbazone. Fifty milligrams of 16α-methyl-17α-hydroxy-21-acetoxy-4-pregnene-3,11,20-trione 3,20-bis-semicarbazone is dissolved in a mixture of 1.0 cc. of benzene and 1.0 cc. of 1.1 N methanolic potassium hydroxide, and the solution is allowed to stand at room temperature for a period of about ten minutes. The solution is then acidified with acetic acid, the benzene is evaporated in vacuo, and the residual material is recrystallized from ethyl acetate to give 16α-methyl-17α,21-dihydroxy-4-pregnene-3,11,20-trione 3,20-bis-semicarbazone.

A mixture of 60 mg. of 16α-methyl-17α,21-dihydroxy-4-pregnene-3,11,20-trione 3,20-bis-semicarbazone, 0.2 ml. of dimethylformamide, 0.6 ml. of chloroform, and 1.5 ml.

of 1.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and the chloroform and dimethylformamide in the combined organic layer is replaced with ethyl acetate by evaporation in vacuo. Petroleum ether is added, and the resulting solution is subjected to a partition chromatogram using aqueous methanol as the stationary phase and benzene-chloroform as the moving phase to give $17\alpha$, 21-dihydroxy-16α-methyl-4-pregnene 3,11,20-trione.

To a solution of 40 g. of 16α-methyl-17α,21-dihydroxy-4-pregnene-3,11,20-trione in 1450 ml. of chloroform is added 380 ml. of 37% aqueous formaldehyde and 380 ml. of concentrated (36%) hydrochloric acid. The mixture is stirred at room temperature for 90 hours. The chloroform layer is separated and the water layer is extracted with two 80-ml. portions of chloroform. The chloroform extracts are combined and washed with two 400-ml. portions of water, two 400-ml. portions of saturated aqueous sodium bicarbonate, and 400 ml. of water. The extract is dried over anhydrous magnesium sulfate and concentrated to form crystals. To this concentrate is added 160 ml. of methanol, and the concentrate is further concentrated to a small volume. An additional 160 cc. of methanol is added, and the solution is concentrated to a thick slurry having a volume of about 100 ml. The slurry is cooled to about 0° to 5° C. and solid 16α-methyl-17α,20,20,21-bis-methylenedioxy-4-pregnene-3,11-dione is filtered. The solid is washed with two 20-ml. portions of cold methanol, and two 28-ml. portions of petroleum ether, and vacuum-dried at 60° C.

The above procedure is illustrative of one method of making 16α - methyl-17α,20,20,21-bismethylenedioxy-4-pregnene-3,11-dione, which is a starting material for making compounds of the present invention. The method of preparing this starting material forms no part of the present invention and other methods may be used, if desired.

This invention will now be illustrated with respect to the following specific examples:

EXAMPLE 1

*2-ethyloxalyl-16α-methyl-17α,20,20,21-bis-methylenedioxy-4-pregnene-3,11-dione*

To a solution of 1.0 g. of 16α-methyl-17α,20,20,21-bis-methylenedioxy-4-pregnene-3,11-dione in a mixture of 15 cc. of tert.-butanol and 5 cc. of benzene were added 1.5 cc. of redistilled diethyl oxalate and 1.3 cc. of 2.375 N sodium methoxide in methanol. The solution turned yellow and was stirred overnight. The solid enolate which formed was removed by filtration and washed with ether. This solid was dissolved in water and the aqueous layer extracted with ether. The aqueous layer was acidified with 2.5 N hydrochloric acid and extracted with ethyl acetate. The ethyl acetate solution was washed with water, dried over anhydrous magnesium sulfate, and concentrated to an oil. The product was 2-ethyloxalyl-16α-methyl - 17α,20,20,21-bis-methylenedioxy - 4 - pregnene-3,11-dione (II). Yield, 900 mg.

Diethyl carbonate can be reacted with 16α-methyl-17α,20,20,21 - bis-methylenedioxy-4-pregnene-3,11-dione according to the foregoing procedure yielding 2-carbethoxy - 16α - methyl-17α,20,20,21 - bis - methylenedioxy-4-pregnene-3,11-dione.

EXAMPLE 2

*2-ethyloxalyl-2,16α-dimethyl-17α,20,20,21-bis-methylenedioxy-4-pregnene-3,11-dione*

The product 2-ethyloxalyl-16α-methyl-17α,20,20,21-bis-methylenedioxy-4-pregnene-3,11-dione of Example 1 was dissolved in 30 cc. of acetone and stirred with 2 g. of potassium carbonate and 1.5 cc. of methyl iodide for 24 hours at 25° C. The acetone was removed by evaporating to dryness in vacuo, and the residue extracted with methylene dichloride. The methylene dichloride was washed with water until neutral, dried, and concentrated to give 2-ethyloxalyl-2,16α-dimethyl-17α,20,20,21-bis-methylenedioxy-4-pregnene-3,11-dione (III). Yield, 920 mg.

$\lambda_{max.}^{MeOH}$ 2420; E percent 198

Reaction of 900 g. of 2-carbethoxy-16α-methyl-17α,20,20,21 - bis-methylenedioxy-4-pregnene-3,11-dione with 1.5 cc. of methyl iodide according to the procedure of Example 2 yields 2 - carbethoxy - 2,16α - dimethyl-17α,20,20,21 - bis-methylenedioxy-4-pregnene-3,11-dione.

Reaction of 900 g. of 2-ethyloxalyl-16α-methyl-17α,20,20,21 - bis-methylenedioxy-4-pregnene-3,11-dione with 1.6 cc. of ethyl iodide yields 2-ethyloxalyl-2-ethyl-16α-methyl-17α,20,20,21 - bis-methylenedioxy - 4 - pregnene-3,11-dione.

EXAMPLE 3

*2α,16α-dimethyl-17α,20,20,21-bis-methylenedioxy-4-pregnene-3,11-dione*

The 900 g. of 2-ethyloxalyl-2,16α-dimethyl-17α,20,20, 21 - bis - methylenedioxy - 4 - pregnene - 3,11-dione (III) formed in Example 2 was dissolved in 30 cc. of methanol and 10 cc. benzene. To this solution was added 1 cc. of 2.375 N sodium methoxide in methanol. This reaction mixture was allowed to stand at 25° for six hours, acidified with 2.5 N hydrochloric acid, diluted with excess water and extracted with benzene. The benzene extract was dried and concentrated to a crude solid product. Yield, 750 mg.

$\lambda_{max}^{MeOH}$ 2380; E percent 230

The crude product was purified by adsorption on "Florisil" (magnesium silicate) and elution with a mixture of "Skellysolve B" (essentially hexane) and acetone containing 1% to 7% of the latter. The purified product thus attained was 2α,16α-dimethyl - 17α,20,20,21 - bis-methylenedioxy-4-pregnene-3,11-dione (IV). Yield, 342 mg.

$\lambda_{max.}^{MeOH}$ 2380; E percent 327

*Analysis.*—Calculated for $C_{25}H_{34}O_6$: C, 69.74%; H, 7.96%. Found: C, 69.90%; H, 8.01%.

Cleavage of 2-carbethoxy-2,16α-dimethyl-17α,20,20,21-bis-methylenedioxy-4-pregnene-3,11-dione can also be effected according to the above procedure, yielding 2α,16α-dimethyl - 17α,20,20,21 - bis-methylenedioxy-4-pregnene-3,11-dione.

The compound 2-ethyloxalyl-2-ethyl-16α-methyl-17α, 20,20,21-bis-methylenedioxy - 4 - pregnene-3,11-dione is cleaved according to the foregoing procedure to give 2α-ethyl - 16α - methyl-17α,20,20,21 - bis-methylenedioxy-4-pregnene-3,11-dione.

EXAMPLE 4

*2α,16α-dimethyl-17α,20,20,21-bis-methylenedioxy-4-pregnene-3,11-dione 3-semicarbazone*

A mixture of 100 mg. of 2α,16α-dimethyl-17α,20,20,21-bis-methylenedioxy-4-pregnene-3,11-dione (IV), 75 mg. of semicarbazide free base and 25 mg. of semicarbazide hydrochloride in a solvent mixture of 2 ml. of methanol and 1 ml. of dimethylformamide was heated at reflux with stirring for seven hours in a nitrogen atmosphere. The reaction mixture was cooled slowly to room temperature and allowed to stand at room temperature for eleven hours. The mixture was further cooled to 0° to 5° C. and 5 ml. of water was added over a period of about twenty minutes, while the temperature was maintained at 0° to 5° C. The product was filtered, washed four times with water, and dried in vacuo at 60° C. The product was 2α,16α-dimethyl-17α,20,20,21-bis-methylenedioxy - 4 - pregnene - 3,11 - dione 3-semicarbazone (V). Yield, 110 mg. (97%).

EXAMPLE 5

*2α,16α-dimethyl-11β-hydroxy-17α,20,20,21-bis-methylenedioxy-4-pregnene-3-one 3-semicarbazone*

Solutions of 200 mg. of 2α,16α-dimethyl-17α,20,20,21-bis-methylenedioxy-4-pregnene - 3,11 - dione 3-semicarbazone (V) in 4.6 ml. of tetrahydrofuran and 70.5 mg. of sodium borohydride in 4.6 ml. of water were purged five times by alternating 20 inches of vacuum and 2 p.s.i. of nitrogen. The sodium borohydride solution was added to the solution of 2α,16α - dimethyl - 17α,20,20,21-bis-methylenedioxy-4-pregnene-3,11-dione 3-semicarbazone, and the mixture was stirred at room temperature under nitrogen for four hours. The excess sodium borohydride was decomposed by cautiously adding 1 N hydrochloric acid. The mixture was concentrated in vacuo at 20° to 25° C. until substantially all of the tetrahydrofuran had been removed. The product 2α,16α-dimethyl-11β-hydroxy-17α,20,20,21-bis-methylenedioxy - 4 - pregnene - 3-one 3-semicarbazone (VI) was filtered, washed four times with water, and dried in vacuo at 65° C. Yield, 180 mg. (89%).

EXAMPLE 6

*2α,16α-dimethyl-11β,17α,21-trihydroxy-4-pregnene-3,20-dione*

A mixture of 158 mg. of 2α,16α-dimethyl-11β-hydroxy-17α,20,20,21-bis-methylenedioxy-4 - pregnene - 3 - one 3-semicarbazone and 18 cc. of 50% acetic acid was heated at 100° C. for four hours. The reaction mixture was concentrated in vacuo and the concentrate dissolved in ethyl acetate. The organic layer was washed with aqueous sodium bicarbonate to neutrality and then washed with water. The ethyl acetate solution was dried over anhydrous magnesium sulfate, filtered, and concentrated to form the solid product 2α,16α-dimethyl-11β,17α,21-trihydroxy-4-pregnene-3,20-dione. Yield, 117 mg.

The crude product was purified by descending paper chromatography on 12 strips of No. 4 Whatman paper, using a 3:1 (by volume) mixture of methanol and formamide as the stationary phase and benzene as the mobile phase. The reagents which had positive blue tetrazolium tests and ultraviolet spectra characteristic of 3-keto-4-pregnene compounds were eluted and worked up in chloroform. The chloroform solution was concentrated to an oil which was dissolved in the minimum amount of methanol, causing crystals to separate. A volume of water equal to the volume of the mixture was added. The crystals of 2α,16α - dimethyl - 11β,17α,21 - trihydroxy-4-pregnene-3-one (VII) were filtered, washed with water and ether, and dried in vacuo at 50° C. Yield 26.1 mg.; M.P. 196°–200° C.;

$\lambda_{max.}^{MeOH}$ 2420; E percent 368.

*Analysis.*—Calculated for $C_{23}H_{34}O_5$; C, 70.74%; H, 8.78%. Found: C, 70.92%; H, 8.91%.

EXAMPLE 7

*2α,16α-dimethyl-17α,21-dihydroxy-4-pregnene-3,11,20-trione*

A mixture of 158 mg. of 2α,16α-dimethyl-17α,20-20,21-bis-methylenedioxy-4-pregnene-3,11-dione and 18 cc. of 50% acetic acid is heated at 100° C. on a steam bath for four hours. The reaction mixture is cooled and diluted with a large excess of water. The resulting mixture is extracted with chloroform and concentrated in vacuo, yielding 2α,16α-dimethyl-17α,21-dihydroxy-4 - pregnene-3,11,20-trione (VIII).

Hydrolysis of 2α,16α-dimethyl-17α,20-20,21-bis-methylenedioxy-4-pregnene-3,11-dione (IV) with 60% formic acid at 100° C. for 15 minutes, followed by product recovery according to the procedure of the foregoing example, also results in the formation of 2α,16α-dimethyl-17α,21-dihydroxy-4-pregnene-3,11,20-trione (VIII).

EXAMPLE 8

*Formation of 2α,6α-dimethyl substituted 1,4-pregnadienes*

Fifty milliliters of a nutrient medium are prepared having the following composition:

| | | |
|---|---|---|
| Dextrose | g | 1 |
| Lactalbumin digest ("Edamin") | g | 1 |
| Cornsteep liquor | ml | 0.25 |
| Distilled water to make 50 ml. | | |

This medium is adjusted to pH 6.5 with KOH, sterilized and inoculated with about 2.5 to 5 ml. of a culture of the microorganism *Bacillus sphaericus* (ATCC 12488); and the inoculated culture is then incubated at a temperature of 28° C., with agitation, for a 24-hour period. To the resulting culture is added a solution containing 10 mg. of 2α,16α-dimethyl-17α,21-dihydroxy - 4 - pregnene-3,11,20-trione dissolved in 0.2 ml. of dimethylformamide. The culture containing the steroid compound is incubated, with agitation, for an additional period of about 24 hours at 28° C.

The fermentation broth is extracted with four 50 ml. portions of ethyl acetate, and the ethyl acetate extracts are combined and evaporated in vacuo to a volume of about 5 ml. The concentrated solution is then streaked on paper chromatograms which are developed using dimethylformamide as the stationary phase and 50% benzene–50% chloroform as the mobile phase. After eight hours development in a descending system, the upper bands for each chromatogram, corresponding to the $\Delta^1$-dehydro derivative, are cut off, extracted with methanol, and the methanol extracted material is again subjected to streak-paper chromatography. The upper band is again cut off, thoroughly dried, extracted with methanol, and the methanol extract is evaporated to dryness in vacuo. The residual material is recrystallized from ethyl acetate-petroleum ether to give 2,16α-dimethyl-17α,21-dihydroxy-1,4-pregnadiene-3,11,20-trione.

The compound 2α,16α-dimethyl-11β,17α,21-trihydroxy-4-pregnene-3,20-dione is converted to 2,16α-dimethyl-11β,17α,21-trihydroxy-1,4-pregnadiene-3,20-dione according to the procedure of Example 8. Other 2α,16α-dimethyl substituted 4-pregnenes which are converted to the corresponding 2,16α-dimethyl substituted 1,4-pregnadienes according to the procedure of Example 8 are 2α,16α-dimethyl-9α-fluoro-17α,21 - dihydroxy-4-pregnene-3,11,20-trione and 2α,16α-dimethyl-9α-fluoro-11β,17α,21-trihydroxy-4-pregnene-3,20-dione, which are converted to 2,16α-dimethyl-9α-fluoro-17α,21 - dihydroxy-1,4-pregnadiene-3,11,20-trione and 2,16α-dimethyl-9α-fluoro-11β,17α,21-trihydroxy-1,4-pregnadiene-3,20-dione, respectively.

Acetylation of any of the substituted, 1,4-pregnadienes prepared in accordance with Example 8 is accomplished by treating the steroid with acetic anhydride and pyridine to give the 21-acetate, which is purified by recrystallization from a benzene-petroleum ether mixture. Acetates formed in this manner include 2,16α-dimethyl-17α-hydroxy-21-acetoxy-1,4-pregnadiene-3,11,20 - trione, 2,16α-dimethyl-11β,17α-dihydroxy-21-acetoxy-1,4-pregnadiene-3,20 - dione, 2,16α - dimethyl-9α-fluoro-17α-hydroxy-21-acetoxy-1,4-pregnadiene-3,11,20-trione, and 2,16α-dimethyl-11β,17α-dihydroxy - 21 - acetoxy-1,4-pregnadiene-3,20-dione. The 21-esters of other carboxylic acids, containing from 1 to 10 carbon atoms, can be made according to this procedure, substituting the appropriate acid anhydride for acetic anhydride.

EXAMPLE 9

*Acetylation of 2α,16α-dimethyl-11β,17α,21-trihydroxy-4-pregnene-3,20-dione*

A mixture of 3.22 g. of 2α,16α-dimethyl-11β,17α-21-trihydroxy-4-pregnene-3,20-dione in 8.6 ml. of pyridine and 2 ml. of acetic anhydride is heated at 52° C. for one and one-fourth hours in a nitrogen atmosphere. The mixture is cooled to 40° C., and 56 ml. of water is added with constant stirring over a 30-minute interval, while keeping the temperature at 40° C. The reaction mixture is then cooled to 0° C. and aged at this temperature for about one hour. The precipitated product is removed by filtration, washed free of pyridine and acetic acid with water and air-dried to constant weight at about 48° C.

The 21-acetate produced according to this procedure can be recovered as such or can be used as a starting material for preparing 9α-fluoro derivatives as will be described in the following examples.

The 21-esters of carboxylic esters, containing from 1 to 10 carbon atoms, can be prepared according to the procedure in this example, substituting the appropriate acid anhydride for acetic anhydride.

EXAMPLE 10

$2\alpha,16\alpha$-dimethyl-$17\alpha$-hydroxy-21-acetoxy-4,9(11)-pregnadiene-3,20-dione About 3.22 g. of $2\alpha,16\alpha$-dimethyl-$11\beta,17\alpha$-dihydroxy-21-acetoxy-4-pregnene-3,20-dione (IX) is dissolved in a mixture of 13 ml. of dimethylformamide and 2.2 ml. of pyridine in a dry 500 cc. three-necked flask equipped with a stirrer. To the resulting solution is added 1.11 ml. of methanesulfonyl chloride. The reaction mixture is maintained from 80° to 85° C. for one hour. The resulting solution is cooled in an ice bath and treated successively with 22 ml. of methanol, 96 cc. of 5% aqueous sodium bicarbonate, and 72 ml. of water. The resulting reaction mixture is allowed to stand at room temperature for about sixteen hours. The precipitated product, which is $2\alpha,16\alpha$-dimethyl-$17\alpha$-hydroxy-21-acetoxy-4,9(11)-pregnadiene-3,20-dione (X), is removed by filtration, washed repeatedly with water, and dried to a constant weight in air at about 50° C.

EXAMPLE 11

$2\alpha,16\alpha$-dimethyl-$9\alpha$-bromo-$11\beta,17\alpha$-dihydroxy-21-acetoxy-4-pregnene-3,20-dione To a suspension of 1.88 g. of $2\alpha,16\alpha$-dimethyl-$17\alpha$-hydroxy-21-acetoxy-4,9(11)-pregnadiene-3,20-dione (X) in 23 ml. of acetone is added with stirring 1.18 g. of N-bromosuccinimide at 0° C., followed by 5.08 ml. of a perchloric acid solution prepared by dissolving 0.110 ml. of 70% perchloric acid in 6.6 ml. of water. The resulting reaction mixture is stirred at 0° C. for about four and three-quarters hours. The excess N-bromosuccinimide is destroyed by the addition of about eight drops of allyl alcohol and 100 ml. of water which are added with stirring. The mixture is held at 0° C. for about one hour. The $2\alpha,16\alpha$-dimethyl-$9\alpha$-bromo-$11\beta,17\alpha$-dihydroxy-21-acetoxy-4-pregnene-3,20-dione (XI) thus prepared is recovered by filtration, washed repeatedly with water, and dried in a desiccator over sulfuric acid at a pressure of 0.1 ml. of mercury for about sixteen hours.

EXAMPLE 12

$2\alpha,16\alpha$-dimethyl-9,11-oxido-$17\alpha,21$-dihydroxy-4-pregnene-3,20-dione A solution of 2.17 g. of $2\alpha,16\alpha$-dimethyl-$9\alpha$-bromo-$11\beta,17\alpha$-dihydroxy-21-acetoxy-4-pregnene-3,20-dione (XI) in 16 ml. of tetrahydrofuran and 8 ml. of methanol is treated with 5.2 ml. of 0.91 N sodium methoxide in methanol in a nitrogen atmosphere at about 25° C. for five minutes. The excess base was neutralized by the addition of excess (approximately 0.32 ml.) of glacial acetic acid, which results in a color change from red to dark yellow. The solution is evaporated in vacuo at a bath temperature of about 45° to 48° C. The resulting crystalline residue is flushed with choroform and then with petroleum ether. This residue, which is a mixture of $2\alpha,16\alpha$-dimethyl-9,11-oxido-$17\alpha,21$-dihydroxy-4-pregnene-3,20-dione and the 21-acetate thereof, is suspended in 9.6 ml. of pyridine and 4.8 ml. of acetic anhydride and heated under a nitrogen atmosphere at about 65° C. for one and one-third hours to reacetlyate the 21-alcohol. The solvents are removed in vacuo at a temperature not greater than about 70° C., and the solid residue is flushed with petroleum ether. About 16 ml. of water is added and the resulting acetate ester is filtered off and washed thoroughly with water. The crude product is dissolved in 18 ml. of acetone, giving a turbid reddish brown solution, which is treated with about 0.2 g. of activated charcoal and filtered. The activated charcoal, which is removed by filtration, is washed with acetone. The filtrate is concentrated to a volume of about 1.5 to 2 ml. on a steam bath in a current of nitrogen, and 16 ml. of petroleum ether is added. A precipitate of $2\alpha,16\alpha$-dimethyl-9,11-oxido-$17\alpha$-hydroxy-21-acetoxy-4-pregnene-3,20-dione (XIII) is formed. This precipitate is filtered and washed with a 10:1 petroleum ether-acetone mixture.

EXAMPLE 13

$2\alpha,16\alpha$-dimethyl-$9\alpha$-fluoro-$11\beta,17\alpha$-dihydroxy-21-acetoxy-4-pregnene-3,20-dione A 3.8 ml. portion of a 2:1 (by weight) mixture of hydrogen fluoride and tetrahydrofuran is mixed with 1.94 ml. of chloroform and 2.5 ml. of tetrahydrofuran, and the mixture is chilled in an acetone-Dry Ice bath. A solution of 1.58 g. of $2\alpha,16\alpha$-dimethyl-9,11-oxido-$17\alpha$-hydroxy-21-acetoxy-4-pregnene-3,20-dione in 13.4 ml. of chloroform is cooled to −60° C. and added to the hydrogen fluoride solution. The resulting mixture is held at 0° C. for about four and one-fourth hours, again chilled to −60° C., and quenched into a mixture of 21 ml. of chloroform, 10 g. of ice, and about 11 g. of potassium carbonate in 9 ml. of water. Solid potassium carbonate is added to keep the final pH in the range of about 7 to 8. The layers are separated and the aqueous phase is back-extracted twice with chloroform. The combined organic layers are washed twice with water and once with a saturated solution of sodium chloride, and dried over anhydrous magnesium sulfate. The solution is concentrated to a volume of about 5 ml., and about 12.6 ml. of benzene is added. The product is allowed to crystallize. The product $2\alpha,16\alpha$-dimethyl-$9\alpha$-fluoro-$11\beta,17\alpha$-dihydroxy-21-acetoxy-4-pregnene-3,20-dione (XIV) is isolated by filtration and washed with benzene.

EXAMPLE 14

$2\alpha,16\alpha$-dimethyl-$9\alpha$-fluoro-$11\beta,17\alpha,21$-trihydroxy-4-pregnene-3,20-dione A 1.10 g. aliquot of $2\alpha,16\alpha$-dimethyl-$9\alpha$-fluoro-$11\beta,17\alpha$-dihydroxy-21-acetoxy-4-pregnene-3,20-dione (XIV) obtained in Example 13 is dissolved in 40 ml. of methanol. The resultant solution is treated with 2.46 ml. of 0.91 N methanolic sodium methoxide in a nitrogen atmosphere. The mixture is stirred at 24° for seven minutes and 0.35 ml. of glacial acetic acid is added. The resulting solution is treated with about 80 mg. of activated carbon, which is stirred for about ten minutes and removed by filtration. The activated carbon is washed with methanol, and the filtrate is diluted with about 40 ml. of water and concentrated to a volume of about 28 ml. The product $2\alpha,16\alpha$-dimethyl-$9\alpha$-fluoro-$11\beta,17\alpha,21$-trihydroxy-4-pregnene-3,20-dione is recovered by filtration, washed with water, and dried.

EXAMPLE 15

$2\alpha,16\alpha$-dimethyl-$9\alpha$-fluoro-$17\alpha$-hydroxy-21-acetoxy-4-pregnene-3,11,20-trione A solution of 1.0 g. of chromic anhydride in 10 ml. of 90% aqueous acetic acid is added to a solution of 1.0 g. of $2\alpha,16\alpha$-dimethyl-$9\alpha$-fluoro-$11\beta,17\alpha$-dihydroxy-21-acetoxy-4-pregnene-3,20-dione (XIV) in 10 ml. of 90% aqueous acetic acid. The mixture is stirred for 30 minutes at room temperature and poured into 80 ml. of water. The mixture is extracted with two 40-ml. portions of methylene dichloride. The methylene dichloride solution is back-extracted with two 20-ml. portions of water followed by two 20-ml. portions of saturated aqueous sodium bicarbonate. The methylene chloride solution is dried over anhydrous sodium sulfate and evaporated to dryness. The product 2α,16α-dimethyl-9α-fluoro-17α-hydroxy-21-acetoxy-4-pregnene-3,11,20-trione (XVI) is recrystallized from methylene dichloride-ether.

EXAMPLE 16

*2α,16α-dimethyl-9α-fluoro-17α,21-dihydroxy-4-pregnene-3,11,20-trione*

A 1.10 g. aliquot of 2α,16α-dimethyl-9α-fluoro-17α-hydroxy-21-acetoxy-4-pregnene-3,11,20-trione (XVI) is dissolved in 40 ml. of methanol. The resultant solution is treated with 2.46 ml. of 0.91 N methanolic sodium methoxide in a nitrogen atmosphere. The mixture is stirred at 24° for seven minutes and 0.35 ml. of glacial acetic acid is added. The resulting solution is treated with about 80 mg. of activated carbon, which is stirred for about ten minutes and removed by filtration. The activated carbon is washed with methanol, and the filtrate is diluted with about 40 ml. of water and concentrated to a volume of about 28 ml. The product 2α,16α-dimethyl-9α-fluoro-17α,21-dihydroxy-4-pregnene-3,11,20-dione (XVII) is recovered by filtration, washed with water, and dried.

While this invention has been described with reference to specific embodiments thereof, it is understood that modifications can be made without departing from the present invention.

What is claimed is:

1. A process for preparing compounds having the formula

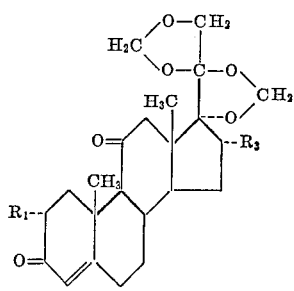

where $R_1$ and $R_3$ are lower alkyl radicals, which comprises reacting a compound having the formula

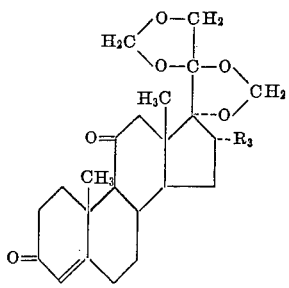

with a di-lower alkyl ester of an acid selected from the group consisting of oxalic acid and carbonic acid, in the presence of an alkali metal alcoholate, acidifying the reaction mixture thereby forming the corresponding 2-acyl-16α-alkyl-17α,20,20,21-bis-methylenedioxy - 4 - pregnene-3,11-dione, reacting said compound with a lower alkyl iodide of the formula $R_1I$, and hydrolyzing the resulting product with an alkaline hydrolyzing agent to form a 2α,16α-dialkyl-17,20,20,21-bis-methylenedioxy - 4 - pregnene-3,11-dione.

2. A process for preparing compounds having the general formula

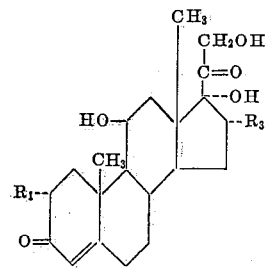

where $R_1$ and $R_3$ are lower alkyl radicals, which comprises reacting a compound having the formula

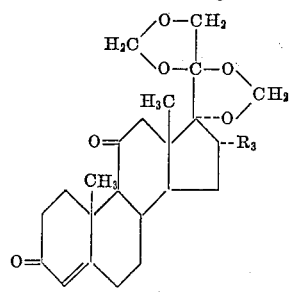

with a di-lower alkyl ester of an acid selected from the group consisting of oxalic acid and carbonic acid, in the presence of an alkali metal alcoholate, acidifying the reaction mixture; thereby forming the corresponding 2-acyl-16α-alkyl-17α,20,20,21-bis-methylenedioxy - 4 - pregnene-3,20-dione, reacting said compound with a lower alkyl iodide of the formula $R_1I$, hydrolyzing the resulting product with an alkaline hydrolyzing agent to form a 2α,16α-dialkyl-17,20,20,21-bis-methylenedioxy-4-pregnene - 3,11-dione, forming the corresponding 3-semicarbazone, reducing the 11-keto radical to 11β-hydroxy with sodium borohydride, in a solvent under an inert atmosphere and hydrolyzing the product with acid to form a 2α,16α-dialkyl-11β,17α,21-trihydroxy-4-pregnene-3,20-dione.

3. A process for preparing compounds having the general formula

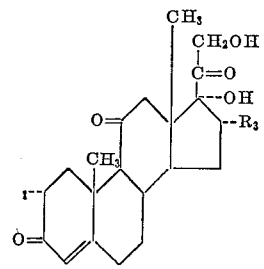

where $R_1$ and $R_3$ are lower alkyl radicals, which comprises reacting a compound having the formula

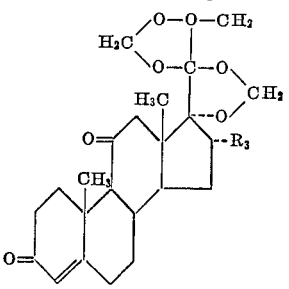

with a di-lower alkyl ester of an acid selected from the group consisting of oxalic acid and carbonic acid, in the presence of an alkali metal alcoholate, acidifying the reaction mixture thereby forming the corresponding 2-acyl-16α-alkyl-17α,20,20,21-bis-methylenedioxy - 4 - pregnene-3,11-dione, reacting said compound with a lower alkyl iodide of the formula $R_1I$, hydrolyzing the resulting product with an alkaline hydrolyzing agent to form a 2α,16α-dialkyl-17α,20,20,21-bis-methylenedioxy-4 - pregnene - 3,11-dione, and hydrolyzing said product with acid to form a 2α,16α-dialkyl-17α,21-dihydroxy-4-pregnene-3,11,20-trione.

4. A process which comprises reacting a compound having the formula

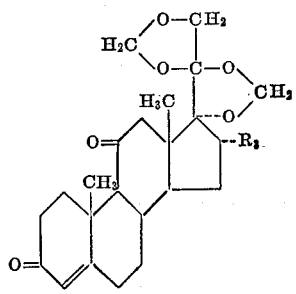

where $R_3$ is a lower alkyl radical with a di-lower alkyl ester of an acid selected from the group consisting of oxalic acid and carbonic acid, in the presence of an alkali metal alcoholate, acidifying the reaction mixture thereby forming the corresponding 2-acyl-16α-alkyl-17α,20,20,21-bis-methylenedioxy-4-pregnene-3,11-dione.

References Cited by the Examiner

Arth et al., J. Am. Chem. Soc., vol. 80 (June 20, 1958), pages 3160–3163.

Hogg et al., J. Am. Chem. Soc., vol. 77 (Dec. 5, 1955), pages 6401 and 6402.

LEWIS GOTTS, *Primary Examiner.*

B. E. LANHAM, LESLIE H. GASTON, MORRIS LIEBMAN, *Examiners.*